United States Patent
Sato (10) Patent No.: US 6,463,077 B1
(45) Date of Patent: Oct. 8, 2002

(54) PHS DATA COMMUNICATION TERMINAL ADAPTER

(75) Inventor: Tsuyoshi Sato, Tokyo (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/175,294

(22) Filed: Oct. 20, 1998

(30) Foreign Application Priority Data

Oct. 21, 1997 (JP) .............................................. 9-288908

(51) Int. Cl.[7] .................................................. H04J 3/16
(52) U.S. Cl. ...................................... 370/465; 370/524
(58) Field of Search ................................. 370/264, 352, 370/437, 466, 467, 493, 401, 522, 524, 338, 465

(56) References Cited

U.S. PATENT DOCUMENTS 5,519,702 A * 5/1996 Takahashi
6,018,520 A * 1/2000 Okada

FOREIGN PATENT DOCUMENTS

| JP | 2-253739 | 10/1990 |
| JP | 8-8992 | 1/1996 |
| JP | 9-64812 | 3/1997 |
| JP | 9-331305 | 12/1997 |
| JP | 11-27323 | 1/1999 |
| JP | 11-98265 | 4/1999 |

OTHER PUBLICATIONS

"Nikkei Communications," No. 244 (Apr. 21, 1997, p. 209.
LAN TIMES (Sep., 1996), pp. 202–205.
Joho Shori (Information Processing), vol. 38, No. 5, pp. 428–434.
"Nikkei Communications," (Aug. 18, 1997), pp. 144–145.
PHS Internet Access Forum Standard (PIAFS), Mar. 1997, PHS Internet Access Forum (Japan), pp. 1–68 and A–1— A–50.

* cited by examiner

Primary Examiner—Melvin Marcelo
Assistant Examiner—Inder Pal Mehra
(74) Attorney, Agent, or Firm—Dickstein, Shapiro, Morin & Oshinsky, LLP (57) ABSTRACT

A PHS data communication terminal adapter which can perform data communication with a data communication terminal on the side of a PHS (Personal Handy-phone System) via a digital network by executing protocol conversion and switching the data transmission bit rate between a high data transmission bit rate (64 kbps) and a low data transmission bit rate(32 kbps) is provided, without needing large signal processing scale and device scale of the PHS data communication terminal adapter, and without deteriorating data communication efficiency. In the PHS data communication terminal adapter, B-channel transmission data composed of 8 bits which have been sent from the data communication terminal on the side of the PHS is received by an S reference point interface section, and the rear 4 bits of the 8-bit B-channel transmission data are separated by a rear part separation section, and the number of "1"s in the rear 4 bits is counted by a rear part counter section. A control section judges whether the data transmission bit rate of the B-channel transmission data is 64 kbps or 32 kbps based on the number of "1"s which has been counted by the rear part counter section, and sets the protocol conversion mode of a protocol conversion section at a high rate protocol conversion mode or a low rate protocol conversion mode according to the judgment.

8 Claims, 5 Drawing Sheets

PHS DATA COMMUNICATION TERMINAL ADAPTER

BACKGROUND OF THE INVENTION

The present invention relates to a PHS data communication terminal adapter, and in particular, to a PHS data communication terminal adapter which performs data communication with a data communication terminal on the side of a PHS (Personal Handy-phone System) via a digital network by executing protocol conversion and switching the data transmission bit rate between a high data transmission bit rate and a low data transmission bit rate.

DESCRIPTION OF THE PRIOR ART

In Personal Handy-phone System (PHS) which has been developed in Japan, data communication terminals which can be connected to PHS handy phones are widely used in order to communicate data, and PHS data communication terminals having radio transmission/reception capability are also utilized. Therefore, communication of data can be executed between data communication terminals which are connected to PHS handy phones, between a PHS data communication terminal (having radio transmission/reception capability) and a data communication terminal which is connected to a PHS handy phone, or between PHS data communication terminals (having radio transmission/reception capability). In the data communication in the PHS, data is transmitted mainly at a bit rate of 32 kbps based on CCITT-I430, and a data transmission bit rate of 64 kbps is also utilized. In Japan, the Personal Handy-phone System is connected with ISDN (Integrated Services Digital Network) and PSTN (Public Switched Telephone Network), and thus data communication between a data communication terminal which is connected to a PHS handy phone (or a PHS data communication terminal having radio transmission/reception capability) and a data communication terminal on the side of the ISDN or PSTN is also possible.

With regard to the Personal Handy-phone System, proposals for standardization of data transmission protocols etc. have been done in order to make data transmission and access to Internet using PHS handy phone easier, in which "PIAFS" (PHS Internet Access Forum Standard) has been standardized in March 1997 by PHS Internet Access Forum (JAPAN). In the PIAFS, methods for controlling synchronized systems in PIAFS data transmission protocol conversion, full-duplex data communication, measurement of answer delay time, flow control, data link establishment/release, data assembing(framing)/disassembling functions, data compression function, etc. have been standardized. Frame types such as negotiation frames, synchronization frames, control frames, data frames, etc. have also been standardized.

As mentioned above, when a data communication terminal on the side of an Integrated Services Digital Network (ISDN) communicates with a data communication terminal on the side of a Personal Handy-phone System (PHS) via the ISDN, data communication is executed at a data transmission bit rate of 32 kbps or 64 kbps in information channels (2Bch) according to the CCITT-1430. The 64 kbps data transmission bit rate is utilized when radio wave conditions for the PHS handy phone are good, and the data transmission bit rate is switched to 32 kbps if the radio wave conditions are not good. The switching of the data transmission bit rate between 32 kbps and 64 kbps is determined and executed exclusively by the data communication terminal on the side of the PHS, since the radio wave conditions are detected on the side of the PHS.

Data transmission from a data communication terminal on the side of a PHS network to a data communication terminal (such as a personal computer) on the side of an ISDN is executed, for example, via a PHS handy phone, a radio base station of the PHS network, the PHS network, the ISDN, an NCU (Network Control Unit), and a PHS data communication terminal adapter to which the data communication terminal on the side of the ISDN is connected. Data transmission from the data communication terminal on the side of the ISDN to the data communication terminal on the side of the PHS network is executed reversely.

Data communication between a PHS handy phone (to which the data communication terminal on the side of the PHS is connected) and the PHS network is executed using (2B'+D) channels. The data transmission bit rate of the B'-channel is 32 kbps or 64 kbps as mentioned above, and the data transmission bit rate of the D-channel is 16 kbps.

The ISDN communicates data utilizing (2B+D) channels (2× (32 kbps or 64 kbps)+16 kbps). Here, in the ISDN, the basic data transmission bit rate is fixed to 64 kbps, in which 8-bit B-channel transmission data is transmitted at a frequency of 8 kHz (8 bits×8 kHz). Therefore, the 32 kbps (4 bits×8 kHz) B-channel transmission data of the ISDN is transmitted utilizing front 4 bits of the 8-bit B-channel transmission data, and rear 4 bits of the 8-bit B-channel transmission data is filled with dummy data such as "1111".

When the 32 kbps B'-channel data is sent from the PHS handy a phone, an exchange (switch) of the PHS network converts the 32 kbps B'-channel data to the 32 kbps B-channel transmission data (in which the front 4 bits of the 8-bit B-channel transmission data are utilized and the rear 4 bits of the 8-bit B-channel transmission data are filled with the dummy data), and sends the 32 kbps B-channel transmission data to the ISDN.

The PHS data communication terminal adapter (TAP) (to which the data communication terminal on the side of the ISDN is connected) which communicates data with the data communication terminal on the side of the PHS network via the ISDN utilizing data transmission bit rates of 32 kbps and 64 kbps operates as follows.

(1) When the PHS data communication terminal adapter is in a SETUP status (when the PHS data communication terminal adapter and the data communication terminal on the side of the PHS have just been established connection, by communicating control information using setup signals on the D-channel), the data communication terminal on the side of the PHS which is going to transmit data to the PHS data communication terminal adapter on the side of the ISDN can not inform the PHS data communication terminal adapter whether its data transmission bit rate is 32 kbps or 64 kbps. Therefore, the data-receiving PHS data communication terminal adapter on the side of the ISDN has to execute the following PIAFS protocol conversions at once or successively, in order to judge whether the data transmission bit rate of the datasending data communication terminal on the side of the PHS is 32 kbps or 64 kbps and set protocol conversion mode of itself at a "high rate protocol conversion mode" which corresponds to the high data transmission bit rate (64 kbps) or a "low rate protocol conversion mode" which corresponds to the low data transmission bit rate (32 kbps) based on the judgment.

(a) The PHS data communication terminal adapter executes 64 kbps PIAFS protocol conversion to all the bits of the 64 kbps B-channel transmission data.

(b) The PHS data communication terminal adapter executes 32 kbps PIAFS protocol conversion to the front 4-bit data of the 64 kbps B-channel transmission data composed of 8 bits.

(2) When data transmission bit rate is changed from 64 kbps to 32 kbps by the data communication terminal on the side of the PHS by channel switching during data communication, the PHS data communication terminal adapter has to execute the following PIAFS protocol conversions at once or successively, in order to judge whether the data transmission bit rate of the data-sending data communication terminal on the side of the PHS is 32 kbps or 64 kbps and set the protocol conversion mode of itself at the high rate protocol conversion mode corresponding to the high data transmission bit rate (64 kbps) or the low rate protocol conversion mode corresponding to the low data transmission bit rate (32 kbps) based on the judgment.

(a) The PHS data communication terminal adapter executes 32 kbps PIAFS protocol conversion to the front 4-bit data of the 64 kbps B-channel transmission data composed of 8 bits.

(b) The PHS data communication terminal adapter executes 32 kbps PIAFS protocol conversion to the rear 4-bit data of the 64 kbps B-channel transmission data composed of 8 bits.

(c) The PHS data communication terminal adapter executes 64 kbps PIAFS protocol conversion to all the bits of the 64 kbps B-channel transmission data.

(3) On the other hand, when data transmission bit rate is changed from 32 kbps to 64 kbps by the data communication terminal on the side of the PHS by channel switching during data communication, the PHS data communication terminal adapter has to execute the above three PIAFS protocol conversions ((a), (b) and (c)) at once or successively, in the same way as the above case.

In the PHS data communication terminal adapter, when the data transmission bit rate is switched between 32 kbps and 64 kbps, CRC (Cyclic Redundancy Check) error might occur frequently in the SETUP status or during data transmission. In such cases, synchronization has to be established again, and thus the above PIAFS protocol conversions (a), (b) and (c) in (2) and (3) have to be executed at once or successively. In order to execute the three PIAFS protocol conversions (a), (b) and (c) at once (simultaneously), such a PHS data communication terminal adapter (employing the PIAFS protocol conversion and performing data communication with a data communication terminal on the side of the PHS via the ISDN switching the data transmission bit rate between 32 kbps and 64 kbps) has to be provided with three PIAFS protocol conversion sections.

As described above, when the PIAF standard is employed and data communication is executed via the ISDN switching the data transmission bit rate between 32 kbps and 64 kbps, three PIAFS protocol conversions have to be executed by the PHS data communication terminal adapter at once or successively. In order to execute the three PIAFS protocol conversions at once, the PHS data communication terminal adapter has to be provided with three PIAFS protocol conversion sections. On the other hand, in the case where the three PIAFS protocol conversions are executed successively, long time has to be spent in order to establish synchronization again. As a result, signal processing scale and device scale of the PHS data communication terminal adapter have to be large or data communication efficiency has to be deteriorated, in order to perform data communication via the ISDN employing the PIAFS protocol conversion and switching the data transmission bit rate between 32 kbps and 64 kbps.

While cases in Japan have been described above, similar type of data communication between data communication terminals is also done popularly in the U.S.A. etc. For example, many buildings are provided with private digital networks according to ISDN to which a plurality of data communication terminals (such as personal computers) are connected, and a plurality of PHS handy phones can be connected with the private digital network via radio waves. In such cases, a PHS handy phone is connected to the private digital network via a PBX (Private Branch Exchange) of the private digital network. Data transmission from a data communication terminal which is connected to the PHS handy phone to a data communication terminal (such as a personal computer) on the side of the private digital network is executed, for example, via the PHS handy phone, a PBX of the private digital network, the private digital network, and a PHS data communication terminal adapter to which the data communication terminal on the side of the private digital network is connected. Data transmission from the data communication terminal on the side of the private digital network to the data communication terminal on the side of the PHS handy phone is executed reversely.

Data communication between a PHS handy phone (to which the data communication terminal on the side of the PHS handy phone is connected) and a PBX of the private digital network is executed using (2B'+D) channels. The data transmission bit rate of the B'-channel is 32 kbps or 64 kbps, and the data transmission bit rate of the D-channel is 16 kbps.

The private digital network communicates data utilizing (2B+D) channels (2×(32 kbps or 64 kbps)+16 kbps) according to the ISDN. Therefore, also in the private digital network, the basic data transmission bit rate is fixed to 64 kbps, and 8-bit B-channel transmission data is transmitted at a frequency of 8 kHz (8 bits×8 kHz). Thus, the 32 kbps (4 bits×8 kHz) B-channel transmission data of the private digital network is transmitted utilizing front 4 bits of the 8-bit B-channel transmission data, and rear 4 bits of the 8-bit B-channel transmission data is filled with dummy data such as "1111".

When the 32 kbps B'-channel data is sent from the PHS handy phone, a PBX of the private digital network converts the 32 kbps B'-channel data to 32 kbps B-channel transmission data (in which the front 4 bits of the 8-bit B-channel transmission data are utilized and the rear 4 bits of the 8-bit B-channel transmission data are filled with the dummy data), and transmits the 32 kbps B-channel transmission data in the private digital network.

The 64 kbps data transmission bit rate is utilized when radio wave conditions for the PHS handy phone are good, and the 32 kbps data transmission bit rate is utilized when radio wave conditions for the PHS handy phone are not good. The switching of the data transmission bit rate between 32 kbps and 64 kbps is determined and executed exclusively by the data communication terminal on the side of the PHS handy phone, since the radio wave conditions are detected on the side of the PHS handy phone.

Similarly to the aforementioned cases of JAPAN, the PHS data communication terminal adapter (to which the data communication terminal on the side of the private digital network is connected) which communicates data with the data communication terminal on the side of the PHS handy phone via the private digital network utilizing data transmission bit rates of 32 kbps and 64 kbps also has to execute the aforementioned three PIAFS protocol conversions ((a), (b) and (c)) at once or successively, in order to judge whether the data transmission bit rate of the data-sending data communication terminal on the side of the PHS handy phone is 32 kbps or 64 kbps and set the protocol conversion mode of itself at the high rate protocol conversion mode corresponding to the high data transmission bit rate (64 kbps) or the low rate protocol conversion mode corresponding to the low data transmission bit rate (32 kbps) based on the judgment. Therefore, also in the case of the U.S.A. etc., such a PHS data communication terminal adapter (employing the PIAFS protocol conversion and performing data communication with a data communication terminal on the side of the PHS handy phone via the private digital network switching the data transmission bit rate between 32 kbps and 64 kbps) has to be provided with three PIAFS protocol conversion sections, in order to execute the three PIAFS protocol conversions (a), (b) and (c) simultaneously. In the case where the three PIAFS protocol conversions are executed successively, long time has to be spent in order to establish synchronization again. Therefore, similarly to the case of Japan, signal processing scale and device scale of the PHS data communication terminal adapter have to be large or data communication efficiency has to be deteriorated in order to perform data communication via the private digital network employing the PIAFS protocol conversion and switching the data transmission bit rate between 32 kbps and 64 kbps.

Incidentally, the problems mentioned above exist also when protocol conversion other than PIAFS protocol conversion is employed by the PHS data communication terminal adapter.

SUMMARY OF THE INVENTION

It is therefore the primary object of the present invention to provide a PHS data communication terminal adapter which can perform data communication with a data communication terminal on the side of a PHS (Personal Handyphone System) via a digital network by executing protocol conversion and switching the data transmission bit rate between a high data transmission bit rate and a low data transmission bit rate, without needing large signal processing scale and device scale, and without deteriorating data communication efficiency.

In accordance with a first aspect of the present invention, there is provided a PHS data communication terminal adapter which is provided as a terminal adapter of a first data communication terminal to a digital network for performing data communication with a second data communication terminal on the side of a PHS via the digital network by executing protocol conversion, comprising a protocol conversion means, a data transmission bit rate judgment means, and a protocol conversion mode setting means. The protocol conversion means executes protocol conversions which are needed for data communication between the first data communication terminal and the second data communication terminal on the side of the PHS via the digital network. The data transmission bit rate judgment means judges whether the data transmission bit rate of B-channel transmission data which is supplied from the second data communication terminal via the digital network is a high data transmission bit rate corresponding to the basic rate of the digital network or a low data transmission bit rate corresponding to ½ of the basic rate of the digital network, utilizing a frame synchronizing signal, transmission data and a basic rate clock signal concerning the B-channel transmission data. And the protocol conversion mode setting means sets the protocol conversion mode of the protocol conversion means at a high rate protocol conversion mode corresponding to the high data transmission bit rate or a low rate protocol conversion mode corresponding to the low data transmission bit rate, based on the judgment executed by the data transmission bit rate judgment means.

In accordance with a second aspect of the present invention, in the first aspect, the data transmission bit rate judgment means includes a digital network interface section, a bit separation section, a counter section, and a judgment section. The digital network interface section operates as the interface of the PHS data communication terminal adapter to the digital network. The bit separation section separates the front 4-bit data or the rear 4-bit data of 8-bit B-channel transmission data which is supplied from the digital network interface section utilizing the frame synchronizing signal and the basic rate clock signal. The counter section counts the number of "1"s or "0"s in the front 4-bit data or the rear 4-bit data which has been separated by the bit separation section. And the judgment section judges whether the data transmission bit rate of the B-channel transmission data is the high data transmission bit rate or the low data transmission bit rate based on the number of "1"s or "0"s which has been counted by the counter section.

In accordance with a third aspect of the present invention, in the second aspect, the bit separation section includes a counter and an AND gate. The counter is reset by the frame synchronizing signal which is supplied from the digital network interface section, counts edges of the basic rate clock signal which is supplied from the digital network interface section, and outputs a gate signal which includes a High/Low-level front part corresponding to four pulses of the basic rate clock signal and a Low/High-level rear part corresponding to four pulses of the basic rate clock signal. The AND gate is supplied with the B-channel transmission data and the gate signal which has been non-inverted/inverted, thereby the AND gate obtains the front 4-bit data of the 8-bit B-channel transmission data and supplies the front 4-bit data to the counter section.

In accordance with a fourth aspect of the present invention, in the second aspect, the bit separation section includes a counter and an AND gate. The counter is reset by the frame synchronizing signal which is supplied from the digital network interface section, counts edges of the basic rate clock signal which is supplied from the digital network interface section, and outputs a gate signal which includes a High/Low-level front part corresponding to four pulses of the basic rate clock signal and a Low/High-level rear part corresponding to four pulses of the basic rate clock signal. The AND gate is supplied with the B-channel transmission data and the gate signal which has been inverted/non-inverted, thereby the AND gate obtains the rear 4-bit data of the 8-bit B-channel transmission data and supplies the rear 4-bit data to the counter section.

In accordance with a fifth aspect of the present invention, in the first aspect, the digital network is a narrow-band ISDN (Integrated Services Digital Network), in which the high data transmission bit rate is 64 kbps and the low data transmission bit rate is 32 kbps.

In accordance with a sixth aspect of the present invention, in the first aspect, the digital network is a private digital network according to the narrow-band ISDN (Integrated Services Digital Network), in which the high data transmission bit rate is 64 kbps and the low data transmission bit rate is 32 kbps.

In accordance with a seventh aspect of the present invention, in the first aspect, the protocol conversion means executes protocol conversion according to PIAFS (PHS Internet Access Forum Standard).

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 1:
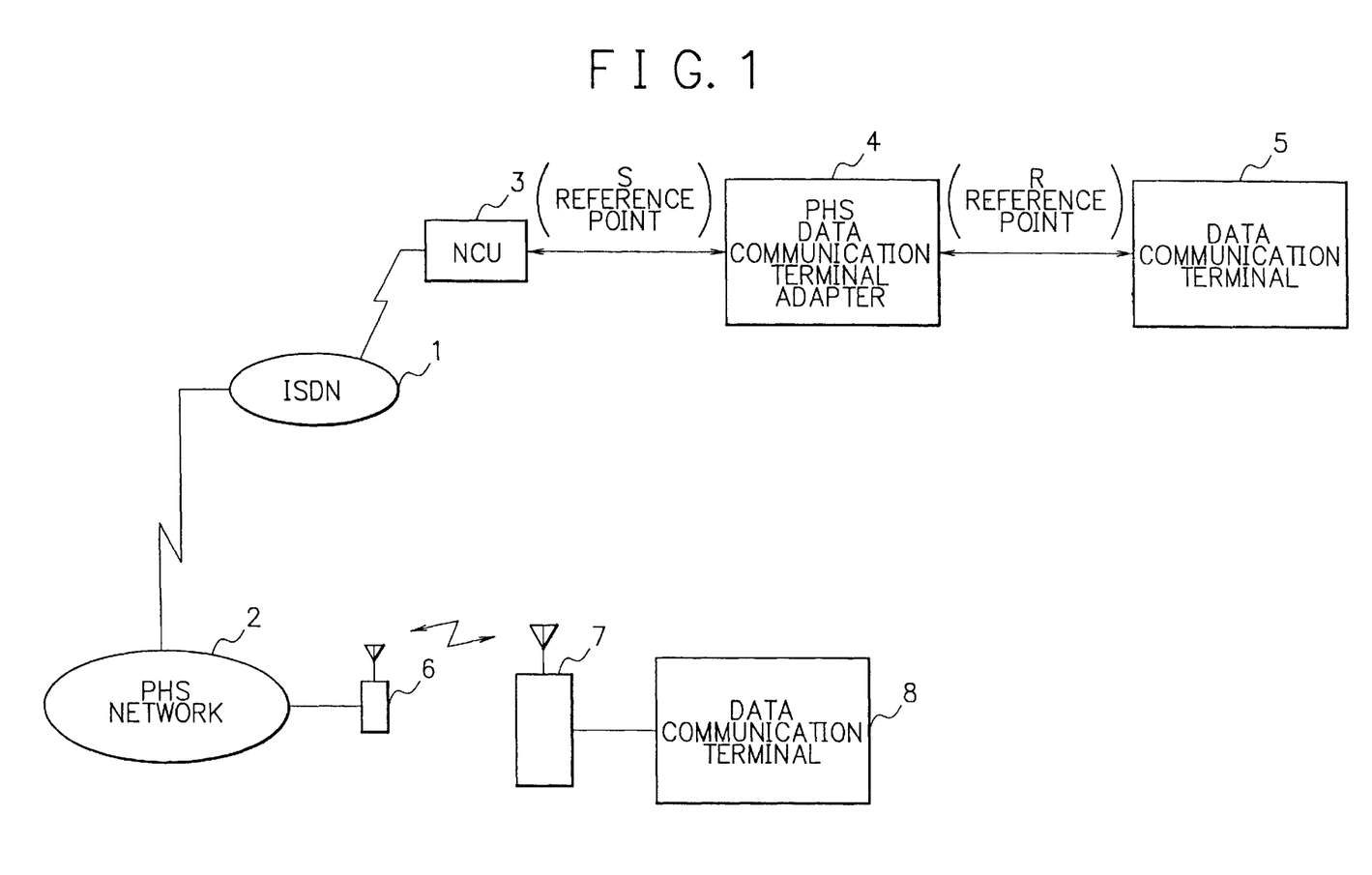
FIG. 1 is a block diagram showing an example of a telecommunication network in which a PHS data communication terminal adapter according to a first embodiment of the present invention is provided.

FIG. 1 is a block diagram showing an example of a telecommunication network in which a PHS data communication terminal adapter according to a first embodiment of the present invention is provided. The telecommunication network shown in FIG. 1 comprises an ISDN (Integrated Services Digital Network) 1, a PHS network (Personal Handy-phone System network) 2, an NCU (Network Control Unit) 3, a PHS data communication terminal adapter 4, a data communication terminal 5 on the side of the ISDN 1, a radio base station 6 of the PHS network 2, a PHS handy phone 7, and a data communication terminal 8 on the side of the PHS network 2.

The ISDN 1 employs the basic rate (narrow-band ISDN, 2B+D: 2×64 kbps+16 kbps). The PHS network 2 executes data communication at data transmission bit rates of 32 kbps and 64 kbps. The NCU 3 is provided in order to connect the PHS data communication terminal adapter 4 to the ISDN 1. The PHS data communication terminal adapter 4 is connected to the S reference point on the output side of the NCU 3. The data communication terminal 5 such as a personal computer etc. is connected to the R reference point on the output side of the PHS data communication terminal adapter 4. The PHS handy phone 7 is connected to the radio base station 6 via radio waves. The data communication terminal 8 on the side of the PHS network 2 utilizes the PHS handy phone 7 for executing data communication with the data communication terminal 5 on the side of the ISDN 1.

Figure 2:
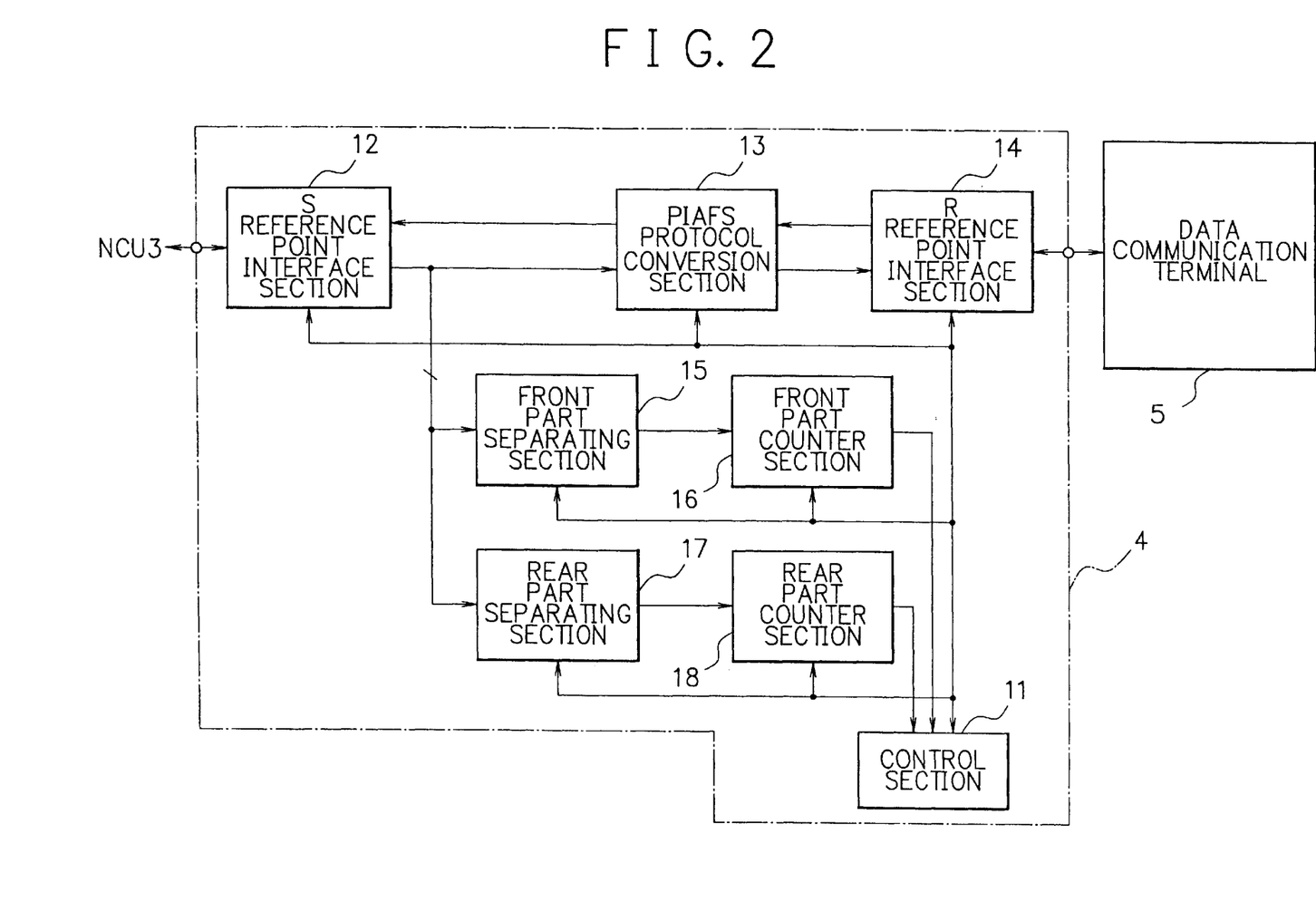
FIG. 2 is a block diagram showing an example of composition of the PHS data communication terminal adapter according to the first embodiment of the present invention.

FIG. 2 is a block diagram showing an example of composition of the PHS data communication terminal adapter 4 according to the first embodiment of the present invention. The PHS data communication terminal adapter 4 shown in FIG. 2 comprises a control section 11 for controlling components of the PHS data communication terminal adapter 4 and executing control on switching of the protocol conversion mode of the PHS data communication terminal adapter 4 between the high rate protocol conversion mode corresponding to the high data transmission bit rate (64 kbps) and the low rate protocol conversion mode corresponding to the low data transmission bit rate (32 kbps), an S reference point interface section 12 as the interface of the PHS data communication terminal adapter 4 to the NCU 3, a PIAFS protocol conversion section 13 for converting transmission data on the R reference point to PIAFS protocol data on the S reference point and converting PIAFS (PHS Internet Access Forum Standard) protocol data on the S reference point to transmission data on the R reference point, an R reference point interface section 14 as the interface of the PHS data communication terminal adapter 4 to the data communication terminal 5 according to RS-232C etc., a front part separating section 15 for separating and obtaining front 4 bits of B-channel transmission data which is composed of 8 bits, a front part counter section 16 for counting the number of "1"s in the front 4 bits which have been obtained by the front part separation section 15, a rear part separating section 17 for separating and obtaining rear 4 bits of the B-channel transmission data which is composed of 8 bits, and a rear part counter section 18 for counting the number of "1"s in the rear 4 bits which have been obtained by the rear part separation section 17.

The PIAFS protocol conversion section 13 executes PIAFS protocol conversion, that is, assembling/disassembling of frames such as synchronization frames, control frames, data frames, etc. according to the PIAFS. The PIAFS protocol conversion section 13 is generally realized by a logical circuit including a CPU, shift registers, etc. The control section 11 is realized, for example, by a microprocessor unit which is composed of a CPU, ROM (Read Only Memory), RAM (Random Access Memory), etc.

Figure 3:
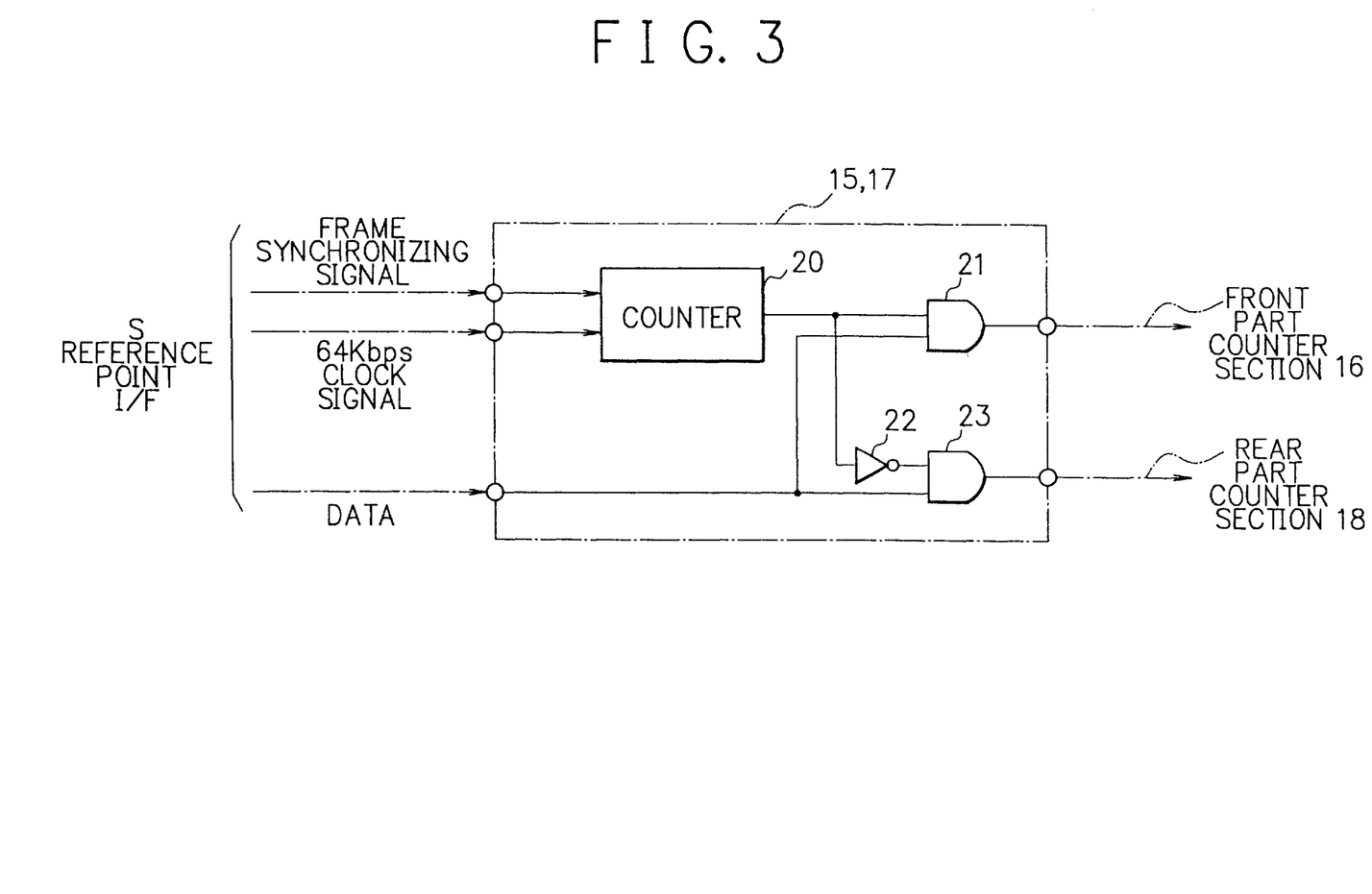
FIG. 3 is a block diagram showing an example of composition of a front part separation section and a rear part separation section shown in FIG. 2.
Figure 4A:
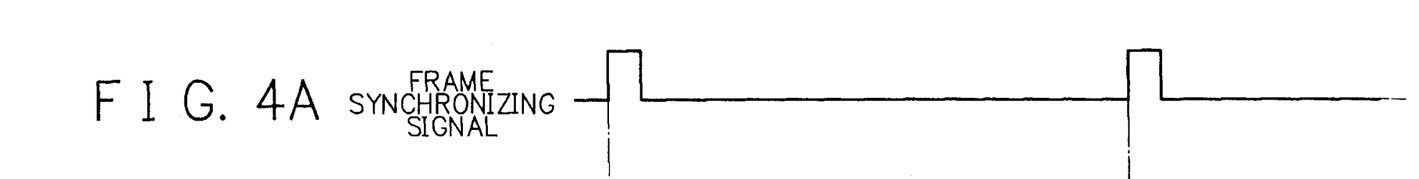
FIG. 4A through FIG. 4D are timing charts showing the operation of the front part separation section and the rear part separation section.
Figure 4B:
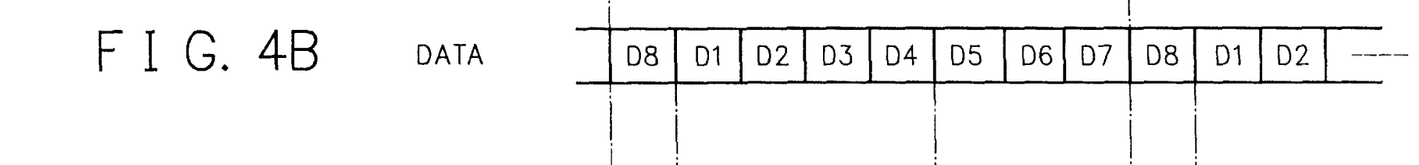
Figure 4C:
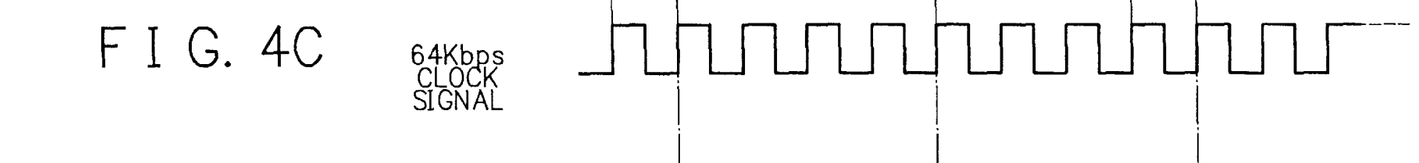
Figure 4D:
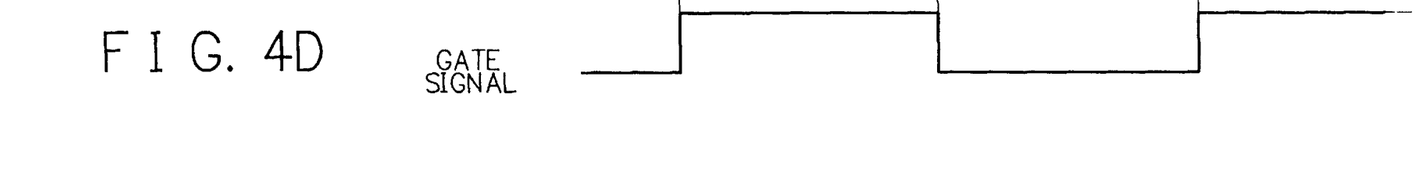

FIG. 3 is a block diagram showing an example of composition of the front part separation section 15 and the rear part separation section 17. The front part separation section 15 and the rear part separation section 17 shown in FIG. 3 include a counter 20, an AND gate 21, an inverter gate 22, and an AND gate 23. FIG. 4A through FIG. 4D are timing charts showing the operation of the front part separation section 15 and the rear part separation section 17. The counter 20 is reset by a frame synchronizing signal which is supplied from the S reference point interface section 12, counts rising edges of a 64 kbps clock signal which is supplied from the S reference point interface section 12, and outputs a gate signal which includes a High-level front part corresponding to four pulses of the 64 kbps clock signal and a Low-level rear part corresponding to four pulses of the 64 kbps clock signal. The AND gate 21 is supplied with the B-channel transmission data and the gate signal, therefore, the front 4 bits of the B-channel transmission data is obtained by the AND gate 21. The front 4 bits of the B-channel transmission data is supplied to the front part counter section 16. The AND gate 23 is supplied with the B-channel transmission data and the gate signal which has been inverted by the inverter gate 22, therefore, the rear 4 bits of the B-channel transmission data is obtained by the AND gate 23. The rear 4 bits of the B-channel transmission data is supplied to the rear part counter section 18.

In the following, the operation of the telecommunication network shown in FIG. 1 will be described.

Referring to FIG. 1, the data communication terminal 5 communicates data with the data communication terminal 8 via the ISDN 1 and the PHS network 2. The data communication terminal 5 on the side of the ISDN 1 executes data communication at a bit rate of 32 kbps or 64 kbps, by PIAFS protocol conversion which is executed by the PHS data communication terminal adapter 4 which is provided to the S reference point on the output side of the NCU 3. The data communication terminal 8 on the side of the PHS network 2 is connected to the PHS network 2 via the PHS handy phone 7 which is connected to the radio base station 6 of the PHS network 2 via radio waves, and thereby executes data communication with the data communication terminal 5 on the side of the ISDN 1 at a bit rate of 32 kbps or 64 kbps.

Data communication between the PHS handy phone 7 and the PHS network 2 is executed using (2B'+D) channels. The data transmission bit rate of the D-channel is 16 kbps, and the data transmission bit rate of the B'-channel is 32 kbps or 64 kbps as mentioned above.

The ISDN 1 communicates data utilizing (2B+D) channels (2×(32 kbps or 64 kbps)+16 kbps). In the ISDN, the basic data transmission bit rate is fixed to 64 kbps, in which 8-bit B-channel transmission data is transmitted at a frequency of 8 kHz (8 bits×8 kHz). Therefore, the 32 kbps (4 bits×8 kHz) B-channel transmission data of the ISDN 1 is transmitted utilizing front 4 bits of the 8-bit B-channel transmission data, and rear 4 bits of the 8-bit B-channel transmission data is filled with dummy data such as "1111".

When the 32 kbps B'-channel data is sent from the data communication terminal 8 and the PHS handy phone 7, an exchange (switch) of the PHS network 2 converts the 32 kbps B'-channel data to 32 kbps B-channel transmission data (in which the front 4 bits of the 8-bit B-channel transmission data are utilized and the rear 4 bits of the 8-bit B-channel transmission data are filled with the dummy data), and sends the 32 kbps B-channel transmission data to the ISDN 1.

The 64 kbps data transmission bit rate is utilized when radio wave conditions for the PHS handy phone 7 are good, and the 32 kbps data transmission bit rate is utilized when radio wave conditions for the PHS handy phone 7 are not good. The setting or switching of the data transmission bit rate between 32 kbps and 64 kbps is determined and executed exclusively by the data communication terminal 8 on the side of the PHS network 2, since the radio wave conditions are detected on the side of the PHS network 2.

The PHS data communication terminal adapter 4 according to the first embodiment of the present invention judges whether the data transmission bit rate which is determined and set by the data communication terminal 8 on the side of the PHS network 2 is 32 kbps or 64 kbps as will be described below, and sets the protocol conversion mode of the PIAFS protocol conversion section 13 at a "high rate protocol conversion mode" which corresponds to the high data transmission bit rate (64 kbps) or a "low rate protocol conversion mode" which corresponds to the low data transmission bit rate (32 kbps) based on the judgment.

In the following, the operation of the PHS data communication terminal adapter 4 shown in FIGS. 1 and 2 will be explained.

Referring to FIGS. 1 and 2, B-channel transmission data which has been sent from the data communication terminal 8 on the side of the PHS network 2 is supplied to the PHS data communication terminal adapter 4 via the PHS handy phone 7, the radio base station 6, the PHS network 2, the ISDN 1, and the NCU 3. In the PHS data communication terminal adapter 4, the B-channel transmission data composed of 8 bits is received by the S reference point interface section 12 and is supplied to the front part separation section 15 and the rear part separation section 17. Subsequently, bits having the value of "1" in the 8-bit B-channel transmission data is monitored by the front part separation section 15, the front part counter section 16, the rear part separation section 17, and the rear part counter section 18. Concretely, the front 4 bits of the 8-bit B-channel transmission data are separated by the front part separation section 15 and are sent to the front part counter section 16, and the number of "1"s in the front 4 bits is counted by the front part counter section 16. Meanwhile, the rear 4 bits of the 8-bit B-channel transmission data are separated by the rear part separation section 17 and are sent to the rear part counter section 18, and the number of "1"s in the rear 4 bits is counted by the rear part counter section 18. The numbers of "1"s counted by the front part counter section 16 and the rear part counter section 18 will be used for judgment by the control section 11.

In data communication employing the PIAFS protocol conversion which is executed by the PIAFS protocol conversion section 13, a synchronization frame is transmitted repeatedly when data transmission bit rate is switched by the data communication terminal 8 between 32 kbps and 64 kbps (that is, when the protocol conversion mode of the PIAFS protocol conversion section 13 should be switched between the high rate protocol conversion mode and the low rate protocol conversion mode. The synchronization frame is transmitted mainly by the data communication terminal 8 on the side of the PHS network 2 in the following cases:

(A) In the SETUP status (when the PHS data communication terminal adapter and the data communication terminal 8 on the side of the PHS network 2 have just been established connection, by communicating control information using setup signals on the D-channel);

(B) When CRC (Cyclic Redundancy Check) error occurs frequently due to radio noise etc; and (C) When the data transmission bit rate is switched between 32 kbps and 64 kbps.

The synchronization frame which is outputted in such cases includes a synchronization field (SYNC word area).

In the case of PIAFS for example, the synchronization field (the SYNC word area) is composed of 32 bits (01010000 11101111 00101001 10010011), and the synchronization frame including the synchronization field is transmitted mainly by the data communication terminal 8 on the side of the PHS network 2 as mentioned above. When data is communicated at the data transmission bit rate of 64 kbps in the ISDN 1, the 32-bit synchronization field is communicated intact (01010000 11101111 00101001 10010011). On the other hand, when data is transmitted at the data transmission bit rate of 32 kbps in the ISDN 1 having the basic rate of 64 kbps, the rear part of the 8-bit B-channel transmission data is filled with the dummy data "1111" as mentioned above, therefore, a 64-bit synchronization field (01011111 00001111 11101111 11111111 00101111 10011111 10011111 00111111) is communicated in the ISDN 1.

FIGS. 4A through 4D show bit segmentation process which is executed by the front part separation section 15 and the rear part separation section 17. In the front part separation section 15 and the rear part separation section 17 shown in FIG. 3, the counter 20 is reset by the frame synchronizing signal shown in FIG. 4A which is supplied from the S reference point interface section 12, and the counter 20 counts the number of pulses (rising edges) of the 64 kbps clock signal shown in FIG. 4C which is supplied from the S reference point interface section 12, thereby the counter 20 outputs the gate signal shown in FIG. 4D which includes the High-level front part corresponding to the front 4 bits of the B-channel transmission data shown in FIG. 4B and the Low-level rear part corresponding to the rear 4 bits of the B-channel transmission data.

The gate signal from the counter 20 and the B-channel transmission data from the S reference point interface section 12 are supplied to the AND gate 21. The AND gate 21 obtains logical product of the High-level front part of the gate signal and the B-channel transmission data, and thereby separates the front 4 bits of the B-channel transmission data. The front 4 bits of the B-channel transmission data obtained by the AND gate 21 is sent to the front part counter section 16. Meanwhile, the gate signal outputted by the counter 20 is inverted by the inverter gate 22, and the inverted gate signal and the B-channel transmission data are supplied to the AND gate 23. The AND gate 23 obtains logical product of the High-level rear part of the inverted gate signal and the B-channel transmission data, and thereby separates the rear 4 bits of the B-channel transmission data. The rear 4 bits of the B-channel transmission data obtained by the AND gate 23 is sent to the rear part counter section 18.

The front part counter section 16 counts the number of "1"s in the front 4 bits of the B-channel transmission data obtained by the front part separation section 15 (the AND gate 21), and sends the result to the control section 11. Meanwhile, the rear part counter section 18 counts the number of "1"s in the rear 4 bits of the B-channel transmission data obtained by the rear part separation section 17 (the AND gate 23), and sends the result to the control section 11.

The control section 11 executes judgment on whether the data transmission bit rate of the communication terminal 8 on the side of the PHS network 2 is 32 kbps or 64 kbps based on the numbers of "1"s which have been counted by the front part counter section 16 and the rear part counter section 18. For example, the 32-bit synchronization field (01010000 11101111 00101001 10010011) is communicated in the ISDN 1 when the data transmission bit rate of the data communication terminal 8 is 64 kbps, and the 64-bit synchronization field (01011111 00001111 11101111 11111111 00101111 10011111 10011111 00111111) is communicated in the ISDN 1 when the data transmission bit rate of the data communication terminal 8 is 32 kbps, as mentioned above. Thus, the number of "1"s which has been counted by the rear part counter section 18 should always be 4 in the case where the data transmission bit rate is 32 kbps, and should vary (not always 4) in the case where the data transmission bit rate is 64 kbps. Therefore, the control section 11 judges that the data transmission bit rate is 32 kbps if the number of "1"s which has been counted by the rear part counter section 18 is consistently 4, and judges that the data transmission bit rate is 64 kbps if the number of "1"s which has been counted by the rear part counter section 18 is not consistently 4.

Incidentally, while the dummy data such as "1111" is inserted to the rear part of the 8-bit B-channel transmission data which is communicated in the ISDN 1 in this embodiment, it is theoretically possible to insert the dummy data such as "1111" to the front part of the 8-bit B-channel transmission data. In the case where such front part dummy data is used, the number of "1"s which has been counted by the front part counter section 16 is used by the control section 11 for judging whether the data transmission bit rate is 32 kbps or 64 kbps. In fact, if the position of the dummy data which is inserted in the 8-bit B-channel data is fixed to the rear part of the 8-bit B-channel data, the front part separation section 15 and the front part counter section 16 can be omitted in the PHS data communication terminal adapter 4. Similarly, if the position of the dummy data is fixed to the front part of the 8-bit B-channel data, the rear part separation section 17 and the rear part counter section 18 can be omitted.

In addition, while the numbers of "1"s was counted by the front part counter section 16 and the rear part counter section 18 in the above explanation, of course it is also possible to let the front part counter section 16 and the rear part counter section 18 count the numbers of "0"s in the front 4 bits and the rear 4 bits of the 8-bit B-channel transmission data and execute the judgment based on the numbers of "0"s which have been counted by the front part counter section 16 and the rear part counter section 18.

Subsequently, the control section 11 sets the protocol conversion mode of the PIAFS protocol conversion section 13 at the high rate protocol conversion mode or the low rate protocol conversion mode, based on the judgment. Here, the control section 11 sets the protocol conversion mode of the PIAFS protocol conversion section 13 at the high rate protocol conversion mode when the data transmission bit rate has been judged to be 64 kbps, and sets the protocol conversion mode of the PIAFS protocol conversion section 13 at the low rate protocol conversion mode when the data transmission bit rate has been judged to be 32 kbps.

In the high rate protocol conversion mode, the PIAFS protocol conversion section 13 executes the PIAFS protocol conversion without the insertion of the dummy data. Concretely, the PIAFS protocol conversion section 13 converts the transmission data on the R reference point to the PIAFS protocol data on the S reference point without inserting the dummy data to the rear 4 bits of the 8-bit B-channel data, and converts the PIAFS protocol data on the S reference point to the transmission data on the R reference point without deleting the rear 4 bits (i.e. the dummy data) of the 8-bit B-channel data.

In the low rate protocol conversion mode, the PIAFS protocol conversion section 13 executes the PIAFS protocol conversion with the insertion of the dummy data. Concretely, the PIAFS protocol conversion section 13 converts the transmission data on the R reference point to the PIAFS protocol data on the S reference point inserting the dummy data to the rear 4 bits of the 8-bit B-channel data, and converts the PIAFS protocol data on the S reference point to the transmission data on the R reference point deleting the rear 4 bits (i.e. the dummy data) of the 8-bit B-channel data.

As described above, in the PHS data communication terminal adapter 4 according to the first embodiment of the present invention, the data transmission bit rate which is determined and set by the data communication terminal 8 on the side of the PHS network 2 is judged by the control section 11 based on the number of "1"s in the rear 4-bit data of the 8-bit B-channel transmission data which has been counted by the rear part counter section 18 (or the number of "1"s in the front 4-bit data of the 8-bit B-channel transmission data which has been counted by the front part counter section 16), and the protocol conversion mode of the PIAFS protocol conversion section 13 is set at the high rate protocol conversion mode corresponding to the high data transmission bit rate (64 kbps) or the low rate protocol conversion mode corresponding to the low data transmission bit rate (32 kbps) based on the judgment. Therefore, in order to execute data communication with the data communication terminal 8 on the side of the PHS network 2 via the ISDN 1 employing the PIAFS protocol conversion and switching the data transmission bit rate between 32 kbps and 64 kbps, the PHS data communication terminal adapter 4 no longer has to execute the three PIAFS protocol conversions ((a): 32 kbps PIAFS protocol conversion to the front 4-bit of the 64 kbps B-channel transmission data composed of 8 bits, (b): 32 kbps PIAFS protocol conversion to the rear 4-bit data of the 64 kbps B-channel transmission data composed of 8 bits, and (c): 64 kbps PIAFS protocol conversion to all the bits of the 64 kbps B-channel transmission data) at once or successively for detecting the data transmission bit rate of the data communication terminal 8 on the side of the PHS network 2.

Consequently, the PHS data communication terminal adapter 4 does not have to be provided with three PIAFS protocol conversion sections for executing the three PIAFS protocol conversion at once, nor does have to spend long time to establish synchronization again for executing the three PIAFS protocol conversion successively.

The judgment on the data transmission bit rate is executed in a simple way using the simple circuit composed of the rear part separation section 17 and the rear part counter section 18 (or the front part separation section 15 and the front part counter section 16). Therefore, according to the first embodiment of the present invention, signal processing scale and device scale of a PHS data communication terminal adapter, which performs data communication with a data communication terminal 8 on the side of the PHS network 2 via the ISDN network 2 employing the PIAFS protocol conversion and switching the data transmission bit rate between 32 kbps and 64 kbps, can be reduced, and data communication efficiency can be improved.

Incidentally, application of the PHS data communication terminal adapter 4 of the first embodiment is not limited to cases where the PIAFS protocol conversion is employed. The effects of the PHS data communication terminal adapter 4 of the first embodiment can also be obtained when the PIAFS protocol conversion section 13 of the PHS data communication terminal adapter 4 executes protocol conversion according to a standard other than PIAFS.

Figure 5:
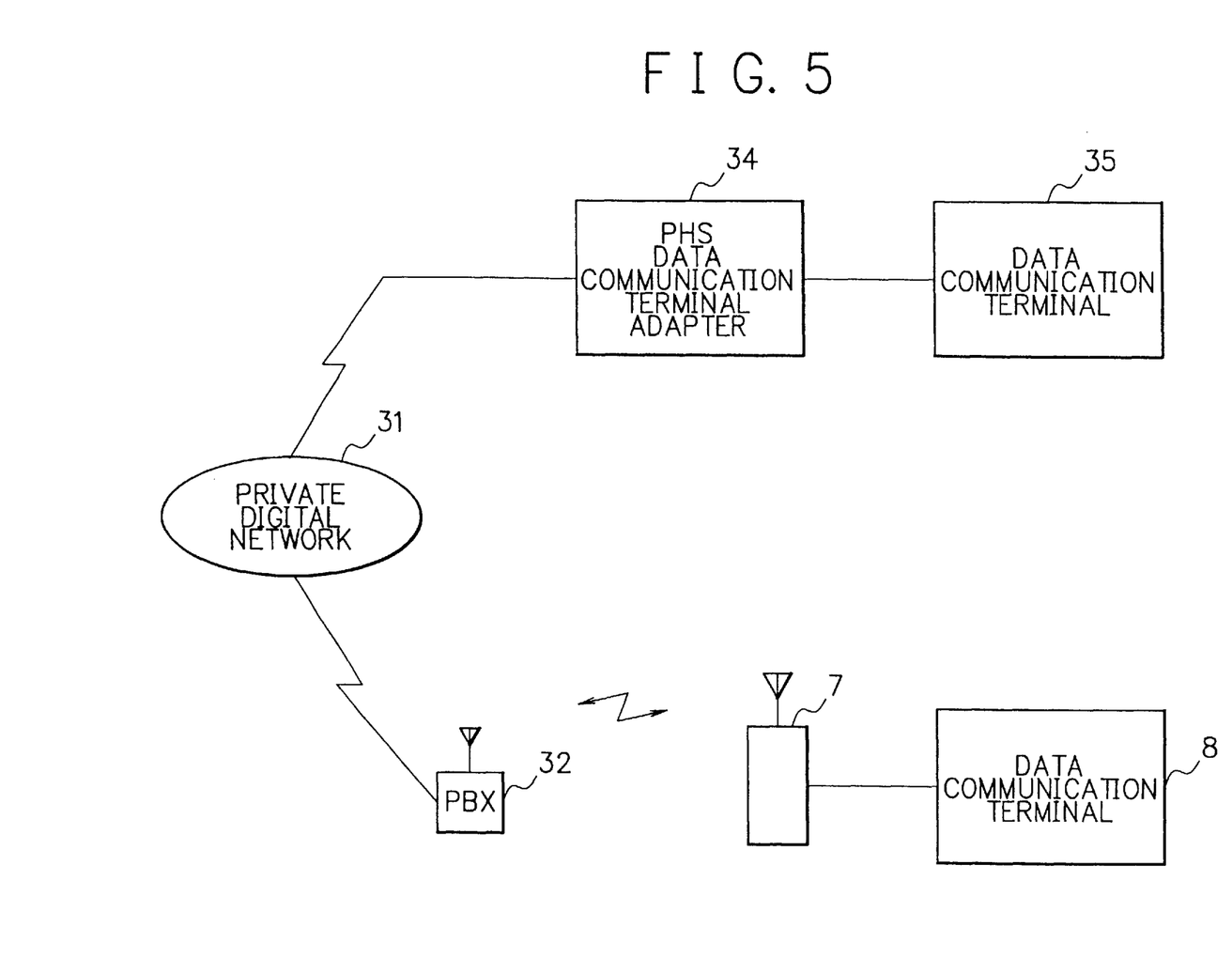
FIG. 5 is a block diagram showing another example of a telecommunication network in which a PHS data communication terminal adapter according to a second embodiment of the present invention is provided.

FIG. 5 is a block diagram showing another example of a telecommunication network in which a PHS data communication terminal adapter according to a second embodiment of the present invention is provided. The telecommunication network shown in FIG. 5 comprises a private digital network 31, a PBX (private branch exchange) 32 of the private digital network 31, a PHS data communication terminal adapter 34 according to the second embodiment of the present invention, a data communication terminal 35 on the side of the private digital network 31, a PHS handy phone 7, and a data communication terminal 8 on the side of the PHS handy phone 7.

The private digital network 31 is constructed in a building, for example. The private digital network 31 is a digital network according to the narrow-band ISDN, and employs the basic rate (2B+D: 2×64 kbps+16 kbps) in the same way as the ISDN 1 of the first embodiment. The PHS handy phone 7 executes data communication at data transmission bit rates of 32 kbps and 64 kbps in the same way as the first embodiment. The PHS data communication terminal adapter 34 is provided as a network termination and a terminal adapter of the private digital network 31, and the data communication terminal 35 such as a personal computer etc. is connected to the PHS data communication terminal adapter 34. The PHS handy phone 7 is connected to the PBX 32 of the private digital network 31 via radio waves. The data communication terminal 8 on the side of the PHS handy phone 7 utilizes the PHS handy phone 7 for executing data communication with the data communication terminal 5 on the side of the private digital network 31. The data communication terminal 35 such as a personal computer is the same as the data communication terminal 5 of the first embodiment, except that the data communication terminal 35 is not a terminal of the ISDN 1 but a terminal of the private digital network 31. The PBX 32 of the private digital network 31 is an exchange of the private digital network 31, which is provided with ISDN interface and capability of communicating with the PHS handy phone 7 via radio waves. The PHS data communication terminal adapter 34 of the second embodiment is realized basically by the same composition as the PHS data communication terminal adapter 4 of the first embodiment which has been shown in FIG. 2, and thus repeated description thereof is omitted for brevity. The PHS data communication terminal adapter 34 operates basically in the same way as the PHS data communication terminal adapter 4.

In the following, the operation of the second embodiment will be described.

Referring to FIG. 5, the data communication terminal 35 communicates data with the data communication terminal 8 via the private digital network 31. The data communication terminal 35 on the side of the private digital network 31 executes data communication at a bit rate of 32 kbps or 64 kbps, by PIAFS protocol conversion which is executed by the PHS data communication terminal adapter 34. The data communication terminal 8 on the side of the PHS handy phone 7 is connected to the private digital network 31 via the PHS handy phone 7, radio waves, and the PBX 32, and thereby executes data communication with the data communication terminal 35 on the side of the private digital network 31 at a bit rate of 32 kbps or 64 kbps.

Data communication between the PHS handy phone 7 and the PBX 6 of the private digital network 31 is executed using (2B'+D) channels. The data transmission bit rate of the D-channel is 16 kbps, and the data transmission bit rate of the B'-channel is 32 kbps or 64 kbps as mentioned above.

The private digital network 31 communicates data utilizing (2B+D) channels (2×(32 kbps or 64 kbps)+16 kbps) in the same way as the ISDN 1 of the first embodiment. Therefore, in the private digital network 31, the basic data transmission bit rate is fixed to 64 kbps, and 8-bit B-channel transmission data is transmitted at a frequency of 8 kHz (8 bits×8 kHz). Thus, the 32 kbps (4 bits×8 kHz) B-channel transmission data of the private digital network 31 is transmitted utilizing front 4 bits of the 8-bit B-channel transmission data, and rear 4 bits of the 8-bit B-channel transmission data is filled with the dummy data such as "1111".

When the 32 kbps B'-channel data is sent from the PHS handy phone 7, a PBX 6 of the private digital network 31 converts the 32 kbps B'-channel data to 32 kbps B-channel transmission data (in which the front 4 bits are utilized and the rear 4 bits are filled with the dummy data), and transmits the 32 kbps B-channel transmission data in the private digital network 31.

The 64 kbps data transmission bit rate is utilized when radio wave conditions for the PHS handy phone 7 are good, and the 32 kbps data transmission bit rate is utilized when radio wave conditions for the PHS handy phone 7 are not good. The switching of the data transmission bit rate between 32 kbps and 64 kbps is determined and executed exclusively by the data communication terminal 8 on the side of the PHS handy phone 7, since the radio wave conditions are detected on the side of the PHS handy phone 7.

The PHS data communication terminal adapter 34 according to the second embodiment of the present invention judges whether the data transmission bit rate which is determined and set by the data communication terminal 8 on the side of the PHS handy phone 7 is 32 kbps or 64 kbps, and sets the protocol conversion mode of the PIAFS protocol conversion section 13 at the high rate protocol conversion mode corresponding to the high data transmission bit rate (64 kbps) or the low rate protocol conversion mode corresponding to the low data transmission bit rate (32 kbps), based on the judgment. The judgment on the data transmission bit rate and the setting of the protocol conversion mode of the PIAFS protocol conversion section 13 is executed in the same way as the first embodiment, and thus repeated description thereof is omitted for brevity.

As described above, in the PHS data communication terminal adapter 34 according to the second embodiment of the present invention, the data transmission bit rate which is determined and set by the data communication terminal 8 on the side of the PHS handy phone 7 is judged, and the protocol conversion mode of the PIAFS protocol conversion section 13 is set at the high rate protocol conversion mode corresponding to the high data transmission bit rate (64 kbps) or the low rate protocol conversion mode corresponding to the low data transmission bit rate (32 kbps) based on the judgment, in the same way as the first embodiment. Therefore, in order to execute data communication with the data communication terminal 8 on the side of the PHS handy phone 7 via the private digital network 31 employing the PIAFS protocol conversion and switching the data transmission bit rate between 32 kbps and 64 kbps, the PHS data communication terminal adapter 34 no longer has to execute the three PIAFS protocol conversions ((a), (b) and (c) at once or successively for detecting the data transmission bit rate of the data communication terminal 8 on the side of the PHS handy phone 7.

Therefore, according to the second embodiment of the present invention, signal processing scale and device scale of a PHS data communication terminal adapter, which performs data communication with a data communication terminal 8 which is connected to a PHS handy phone 7 via a private digital network 31 employing the PIAFS protocol conversion and switching the data transmission bit rate between 32 kbps and 64 kbps, can be reduced, and data communication efficiency can be improved.

Application of the PHS data communication terminal adapter 34 of the second embodiment is not limited to cases where the PIAFS protocol conversion is employed. The effects of the PHS data communication terminal adapter 34 of the second embodiment can also be obtained when the PIAFS protocol conversion section 13 of the PHS data communication terminal adapter 34 executes protocol conversion according to a standard other than PIAFS.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data communication terminal adapter for a first data communication terminal for performing data communication over a digital network with a second data communication terminal on a side of a PHS, comprising:
    a protocol conversion means for executing protocol conversion for data communication between the first data communication terminal and the second data communication terminal;
    a data transmission bit rate judgment means for judging whether the data transmission bit rate of transmission data which is supplied from the second data communication terminal via the digital network is a data transmission bit rate corresponding to the basic rate of the digital network or a second data transmission bit rate corresponding to ½ of the basic rate of the digital network, utilizing a frame synchronizing signal, transmission data and a basic rate clock signal concerning the transmission data; and
    a protocol conversion mode setting means for setting the protocol conversion mode of the protocol conversion means at a rate protocol conversion mode corresponding to the data transmission bit rate or a second rate protocol conversion mode corresponding to the second data transmission bit rate, based on the judgment executed by the data transmission bit rate judgment means.

2. A PHS data communication terminal adapter as claimed in claim 1, wherein the data transmission bit rate judgment means includes:
    a digital network interface section as the interface of the PHS data communication terminal adapter to the digital network;
    a bit separation section for separating the front 4-bit data or the rear 4-bit data of 8-bit B-channel transmission data which is supplied from the digital network interface section utilizing the frame synchronizing signal and the basic rate clock signal;
    a counter section for counting the number of "1"s or "0"s in the front 4-bit data or the rear 4-bit data which has been separated by the bit separation section; and
    a judgment section for judging whether the data transmission bit rate of the B-channel transmission data is the high data transmission bit rate or the low data transmission bit rate based on the number of "1"s or "0"s which has been counted by the counter section.

3. A PHS data communication terminal adapter as claimed in claim 2, wherein the bit separation section includes:
    a counter which is reset by the frame synchronizing signal which is supplied from the digital network interface section, counts edges of the basic rate clock signal which is supplied from the digital network interface section, and outputs a gate signal which includes a High/Low-level front part corresponding to four pulses of the basic rate clock signal and a Low/High-level rear part corresponding to four pulses of the basic rate clock signal; and
    an AND gate which is supplied with the B-channel transmission data and the gate signal which has been non-inverted/inverted, for obtaining the front 4-bit data of the 8-bit B-channel transmission data and supplying the front 4-bit data to the counter section.

4. A PHS data communication terminal adapter as claimed in claim 2, wherein the bit separation section includes:
    a counter which is reset by the frame synchronizing signal which is supplied from the digital network interface section, counts edges of the basic rate clock signal which is supplied from the digital network interface section, and outputs a gate signal which includes a High/Low-level front part corresponding to four pulses of the basic rate clock signal and a Low/High-level rear part corresponding to four pulses of the basic rate clock signal; and
    an AND gate which is supplied with the B-channel transmission data and the gate signal which has been inverted/non-inverted, for obtaining the rear 4-bit data of the 8-bit B-channel transmission data and supplying the rear 4-bit data to the counter section.

5. A PHS data communication terminal adapter as claimed in claim 1, wherein the digital network is a narrow-band ISDN (Integrated Services Digital Network), in which the high data transmission bit rate is 64 kbps and the low data transmission bit rate is 32 kbps.

6. A PHS data communication terminal adapter as claimed in claim 1, wherein the digital network is a private digital network according to the narrow-band ISDN (Integrated Services Digital Network), in which the high data transmission bit rate is 64 kbps and the low data transmission bit rate is 32 kbps.

7. A PHS data communication terminal adapter as claimed in claim 1, wherein the protocol conversion means executes protocol conversion according to PIAFS (PHS Internet Access Forum Standard).

8. A PHS data communication terminal adapter which is provided as a terminal adapter of a first data communication terminal that performs data communication over a network with a second data communication terminal, comprising:

a protocol conversion circuit that executes protocol conversions for data communication between the first data communication terminal and the second data communication terminal;

a data transmission bit rate judgment circuit that judges whether the data transmission bit rate of transmission data transmitted by the second data communication terminal is at a high bit rate corresponding to the basic rate of the network or at a low bit rate corresponding to ½ of the basic rate of the network, utilizing a frame synchronizing signal, transmission data and a basic rate clock signal concerning the transmission data; and a protocol conversion mode setting circuit that sets the protocol conversion mode at a high rate protocol conversion mode corresponding to the high bit rate or a low rate protocol conversion mode corresponding to the low bit rate, based on the judgment executed by the data trans mission bit rate judgment means.

* * * * *